US012496365B1

(12) United States Patent
Muenks

(10) Patent No.: US 12,496,365 B1
(45) Date of Patent: Dec. 16, 2025

(54) UVC LIGHT ASSEMBLY FOR AMBULANCE PATIENT CABIN

(71) Applicant: Cory M. Muenks, Bonoits Mill, MO (US)

(72) Inventor: Cory M. Muenks, Bonoits Mill, MO (US)

( * ) Notice: Subject to any disclaimer, the term of this patent is extended or adjusted under 35 U.S.C. 154(b) by 819 days.

(21) Appl. No.: 17/738,525

(22) Filed: May 6, 2022

Related U.S. Application Data

(60) Provisional application No. 63/185,541, filed on May 7, 2021.

(51) Int. Cl.
*A61L 2/10* (2006.01)

(52) U.S. Cl.
CPC ............ *A61L 2/10* (2013.01); *A61L 2202/11* (2013.01); *A61L 2202/14* (2013.01); *A61L 2202/25* (2013.01)

(58) Field of Classification Search
None
See application file for complete search history.

(56) References Cited

U.S. PATENT DOCUMENTS 9,855,353 B1 * 1/2018 Stacy ........................ A61L 2/10
2013/0280126 A1 * 10/2013 Statham .................. G01J 1/429 422/24
2016/0294252 A1 * 10/2016 Whiteley ............. H02K 1/2726
2021/0128764 A1 * 5/2021 Childress .................. A61L 2/24
2022/0111105 A1 * 4/2022 Pan ........................... A61L 9/20

FOREIGN PATENT DOCUMENTS

AU 2015210393 A1 * 9/2015 ............... A23L 3/28

OTHER PUBLICATIONS https://web.archive.org/web/20210301103953/https://www.instructables.com/Complete-Motor-Guide-for-Robotics/ (Year: 2013).*

* cited by examiner

*Primary Examiner* — James Choi
(74) *Attorney, Agent, or Firm* — Grace J. Fishel

(57) ABSTRACT

A UVC light assembly for an ambulance patient cabin with one or more UVC lights mounted under spring biased doors in a recessed ceiling housing. A pivotable light mount rotated by a linear actuator rotates the one or more UVC lights from horizontal to vertical position in the housing and pushes open the spring biased doors. A timer element passes current through the one or more UVC lights when they are in vertical position. The timer element then stops the current and reverses the polarity on the linear actuator after a predetermined time causing the linear actuator to rotate the light mount with the UVC lights back into horizontal position and the spring biased doors to close.

7 Claims, 14 Drawing Sheets

UVC LIGHT ASSEMBLY FOR AMBULANCE PATIENT CABIN

BACKGROUND OF THE INVENTION

Field of the Invention

The present invention relates to a UVC light assembly for attachment to the ceiling of an ambulance patient cabin wherein the UVC light is stored in horizontal position but in use is deployed vertically.

Brief Description of the Prior Art

The use of ultraviolet (UVC) light has been used in ambulances as a possible way to kill bacterial and viruses. Previously UVC light assemblies with reflectors have been hung flat on the ceiling or positioned about the sidewalls. While the reflectors affect some reflection, the reflector greatly reduces the light's effectiveness. Another problem with flat hung UVC lights is that the unit will only disinfect areas that are in sight of the device. Any surfaces that are blocked from the light by other objects will not be cleaned. Hence given the complex layout of most ambulances, a plurality of lights on both the ceiling and the walls are usually needed.

The present invention eliminates the need for reflectors and places the UVC light more effectively in sight of the cabin contents such that the need for additional UVC lights is reduced or eliminated.

BRIEF SUMMARY OF THE INVENTION

In accordance with the present invention a recess ceiling mounted self deploying and storing UVC germicidal light with protective doors, a remote activation switch and warning light for an ambulance is disclosed. The light is stored horizontally in the housing. When activated the doors open and the UVC light is moved down to a vertical position by a linear actuator. The light power is controlled by an adjustable timer element. When the timer element shuts the UVC light off and the light has cooled the linear actuator brings the light back up into the housing into the horizontal position, the doors close and the warning light shuts off. The run times are all adjustable.

In the vertical position with nothing blocking the UVC light, the light waves get to the walls, ceiling and under cabinets. Other systems with the UVC light hung flat on the ceiling only get the surfaces directly under the light because the light is only shining down. In addition, the light on the backside of the UVC bulb loses intensity when reflected downward by a reflector.

BRIEF DESCRIPTION OF THE SEVERAL VIEWS OF THE DRAWINGS

In the accompanying drawings one of various possible embodiments of the invention is illustrated, in which.

DETAILED DESCRIPTION OF AT LEAST ONE PREFERRED EMBODIMENT OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 7:
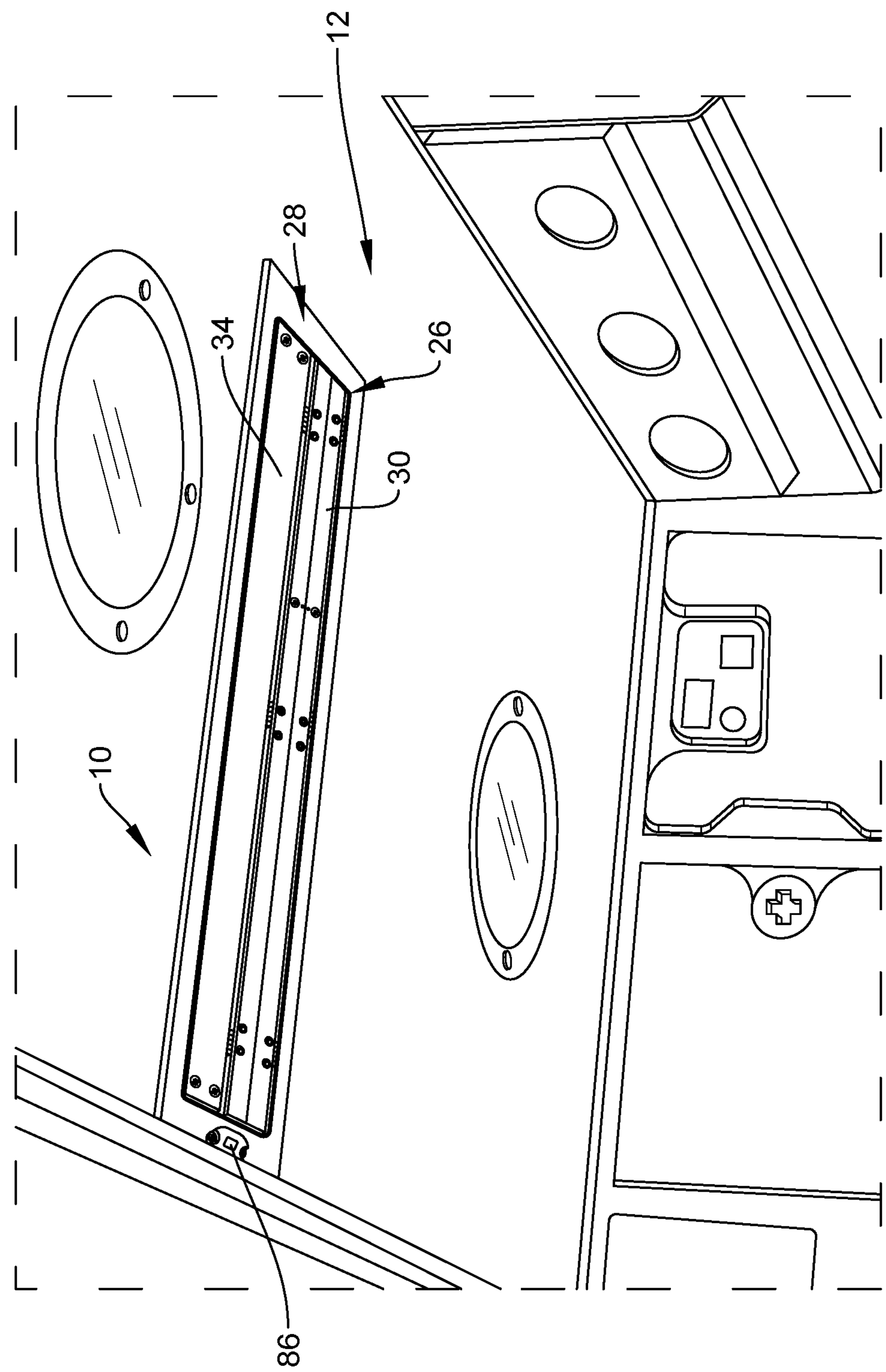
FIG. 7 is perspective view of the UVC light assembly recessed in the ceiling of an ambulance patient cabin.

Referring to the drawings more particularly by reference character, beginning with FIGS. 1-7, as shown in FIG. 7, a UVC light assembly 10 in accordance with the present invention is shown mounted in the ceiling of an ambulance patient cabin 12 having side and rear entry doors and a floor. As shown in FIGS. 1-6, UVC light assembly 10 includes a housing 14. In the form illustrated, housing 14 is a rectangular cabinet with a flange 16 and is recessed into the ceiling. Cabinet 14 has a bottom wall 18, side walls 20, end walls 22 and a divider wall 24 splitting the cabinet into a first compartment 26 and a second compartment 28. First compartment 26 has center opening doors 30 hinged on one side to one of side walls 20 and on another side to divider wall 24. Center opening doors 30 are biased closed with springs 32. Second compartment 28 is closed with a plate 34 attached to support brackets 36 on end walls 22.

Figure 1:
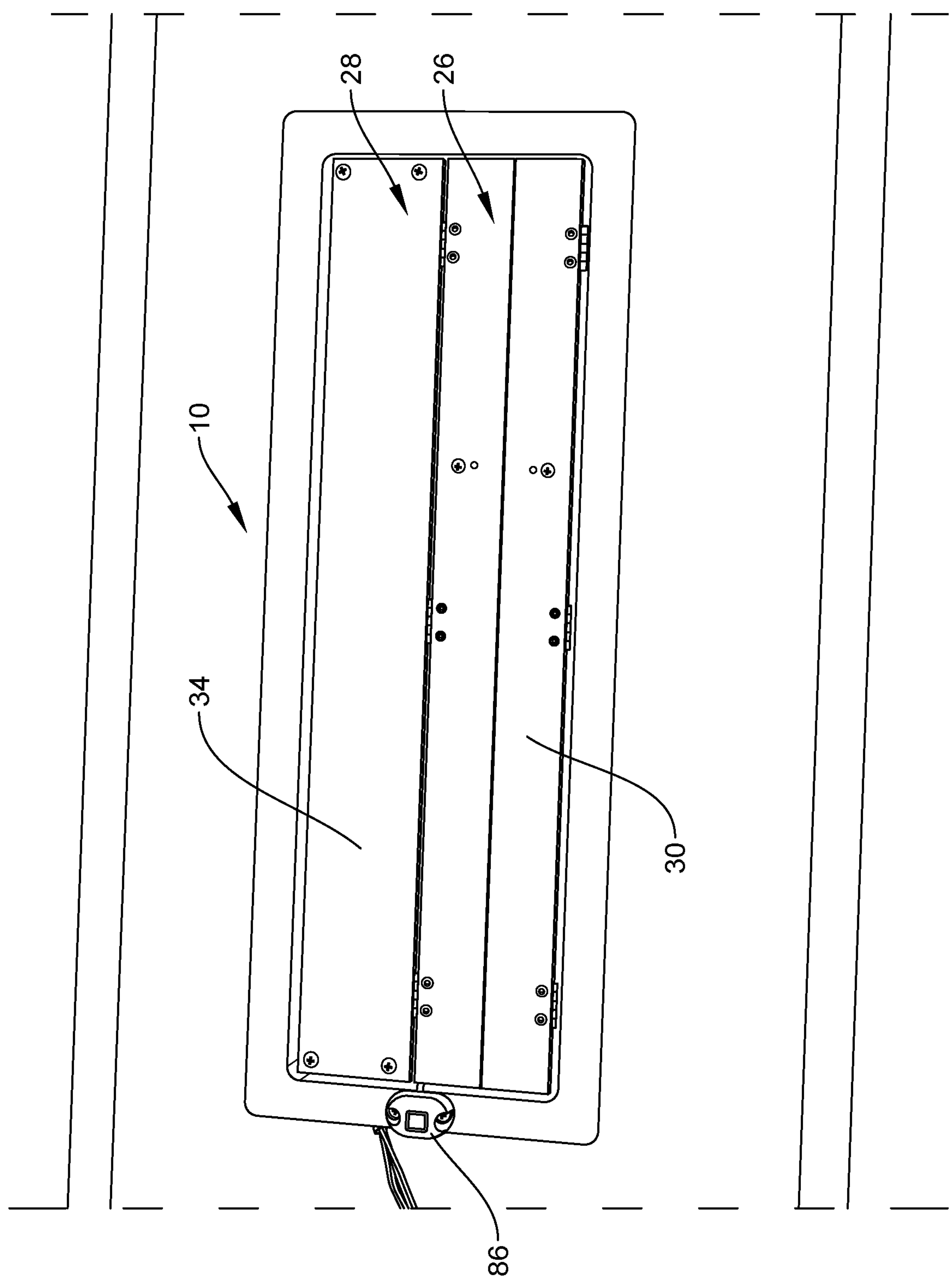
FIG. 1 is bottom view of a UVC light assembly recessed into the ceiling of an ambulance patient cabin.
Figure 2:
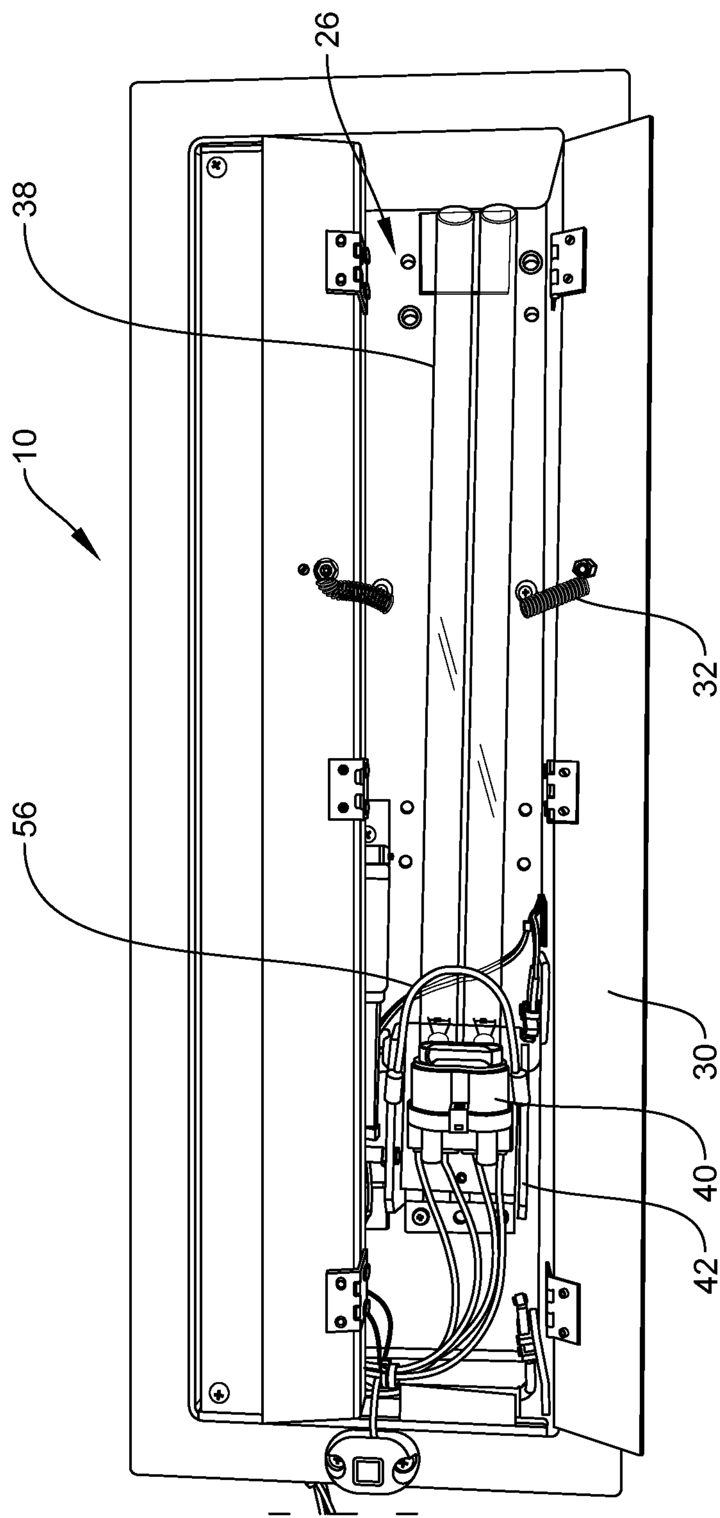
FIG. 2 is a bottom view of the UVC light assembly showing a first compartment with center opening doors forced open to show UVC lights in horizontal position.
Figure 3:
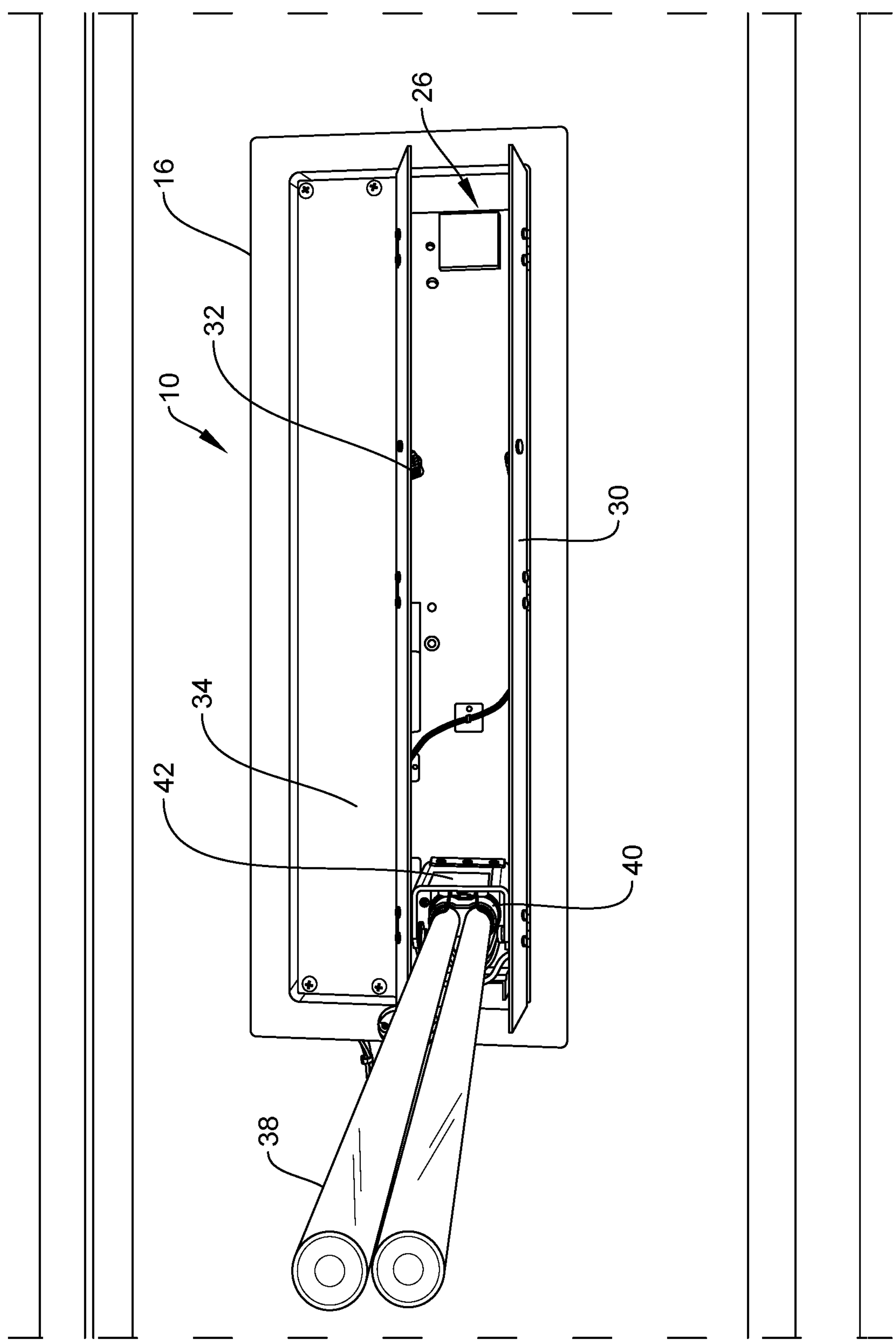
FIG. 3 is a bottom view of the UVC light assembly with the UVC lights in vertical position and the center opening doors held open by a door push.
Figure 4:
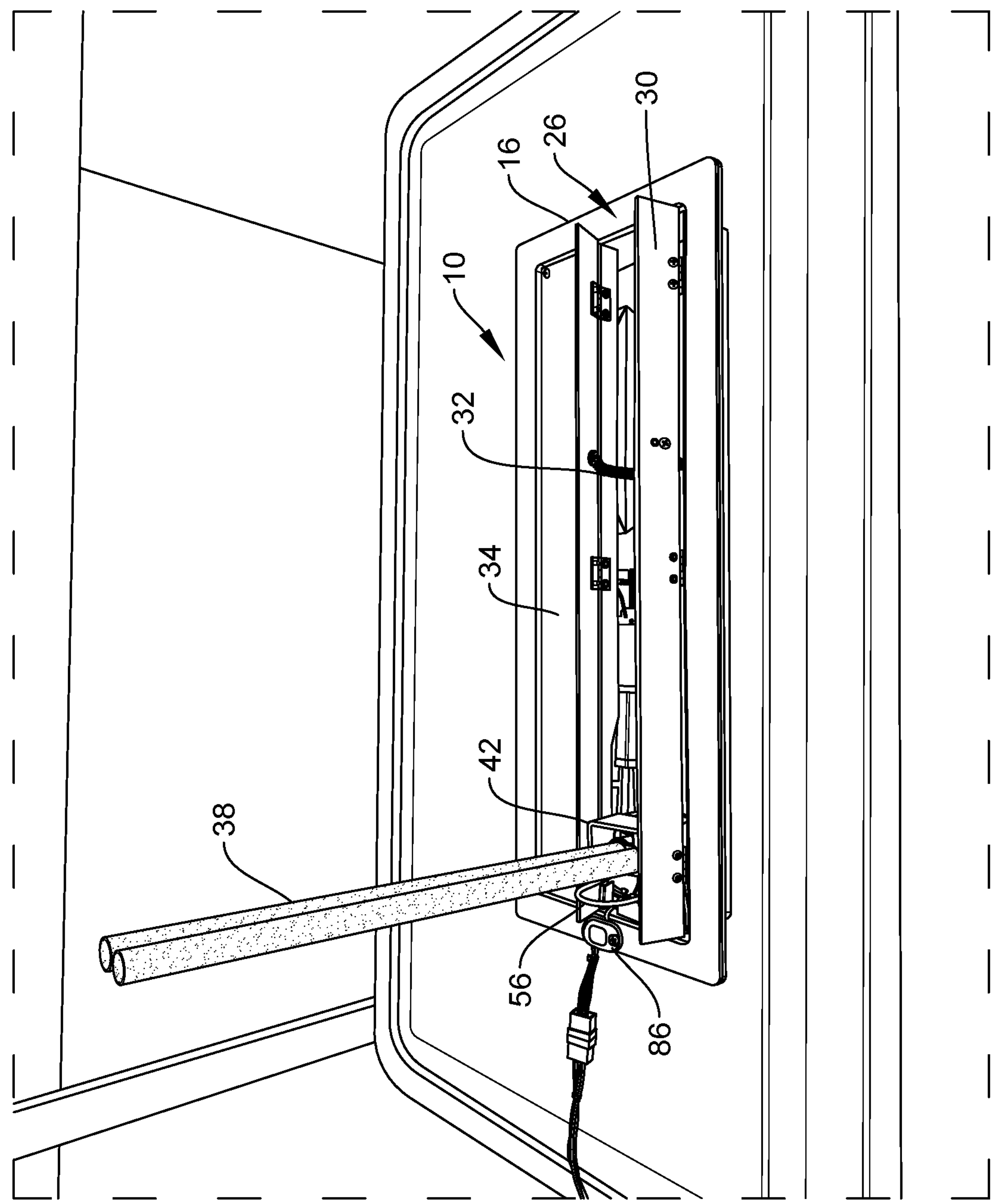
FIG. 4 is perspective view of the UVC light assembly with the UVC lights in vertical position and the center opening doors held open by a door push.
Figure 8:
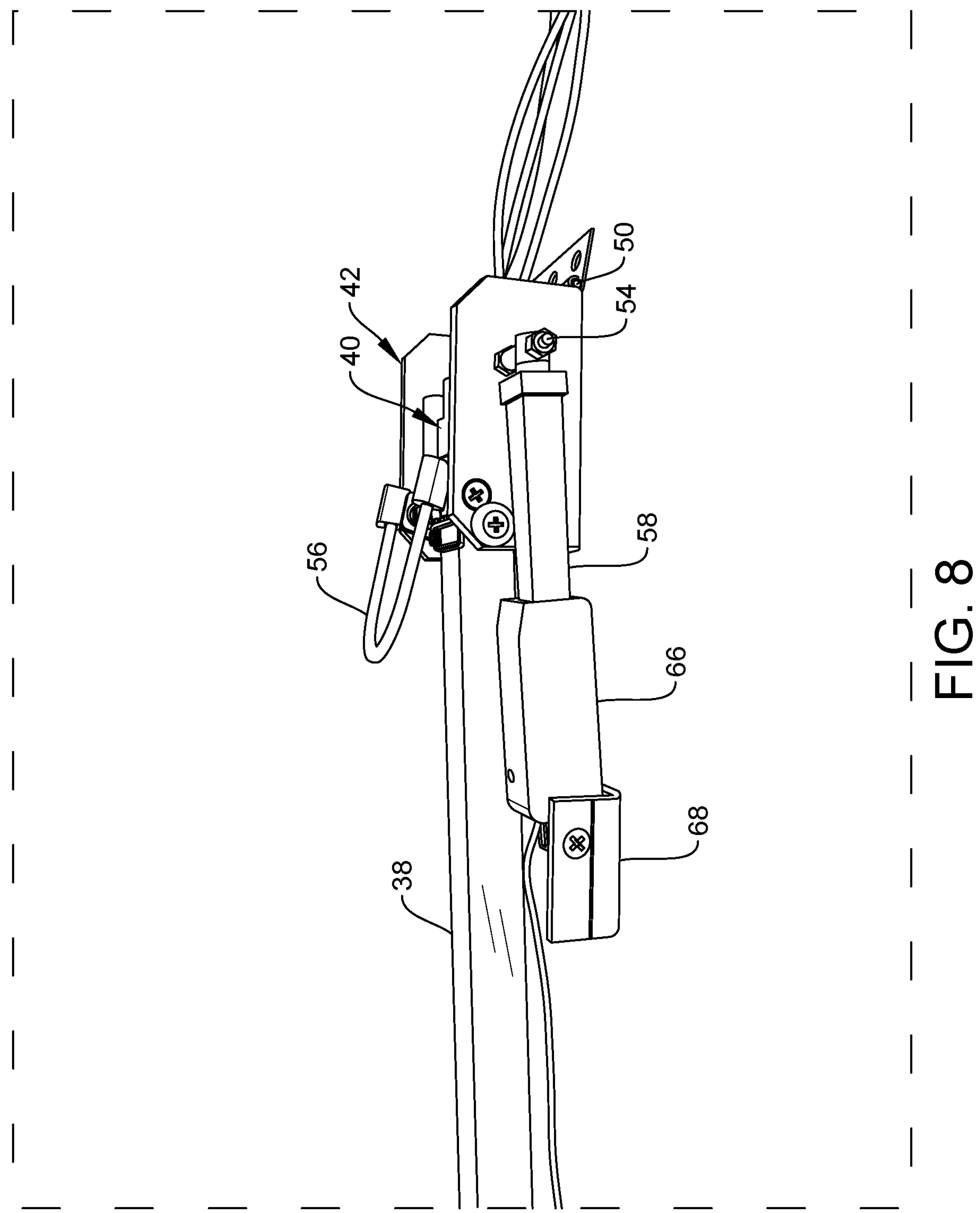
FIG. 8 is side view of a linear actuator with a light mount and UVC lights in horizontal position.
Figure 9:
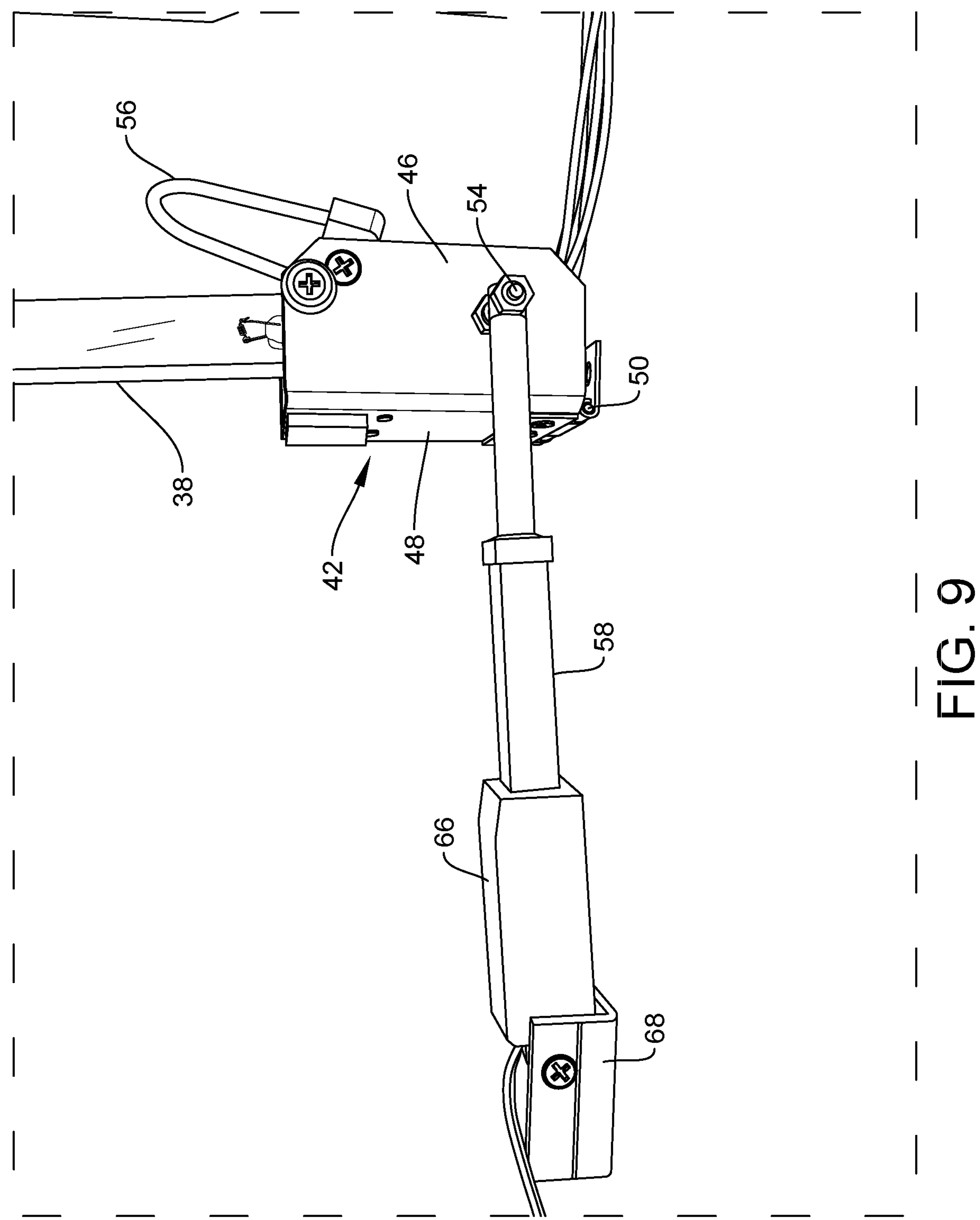
FIG. 9 is a side view of the linear actuator with the light mount and UVC lights in vertical position.
Figure 10:
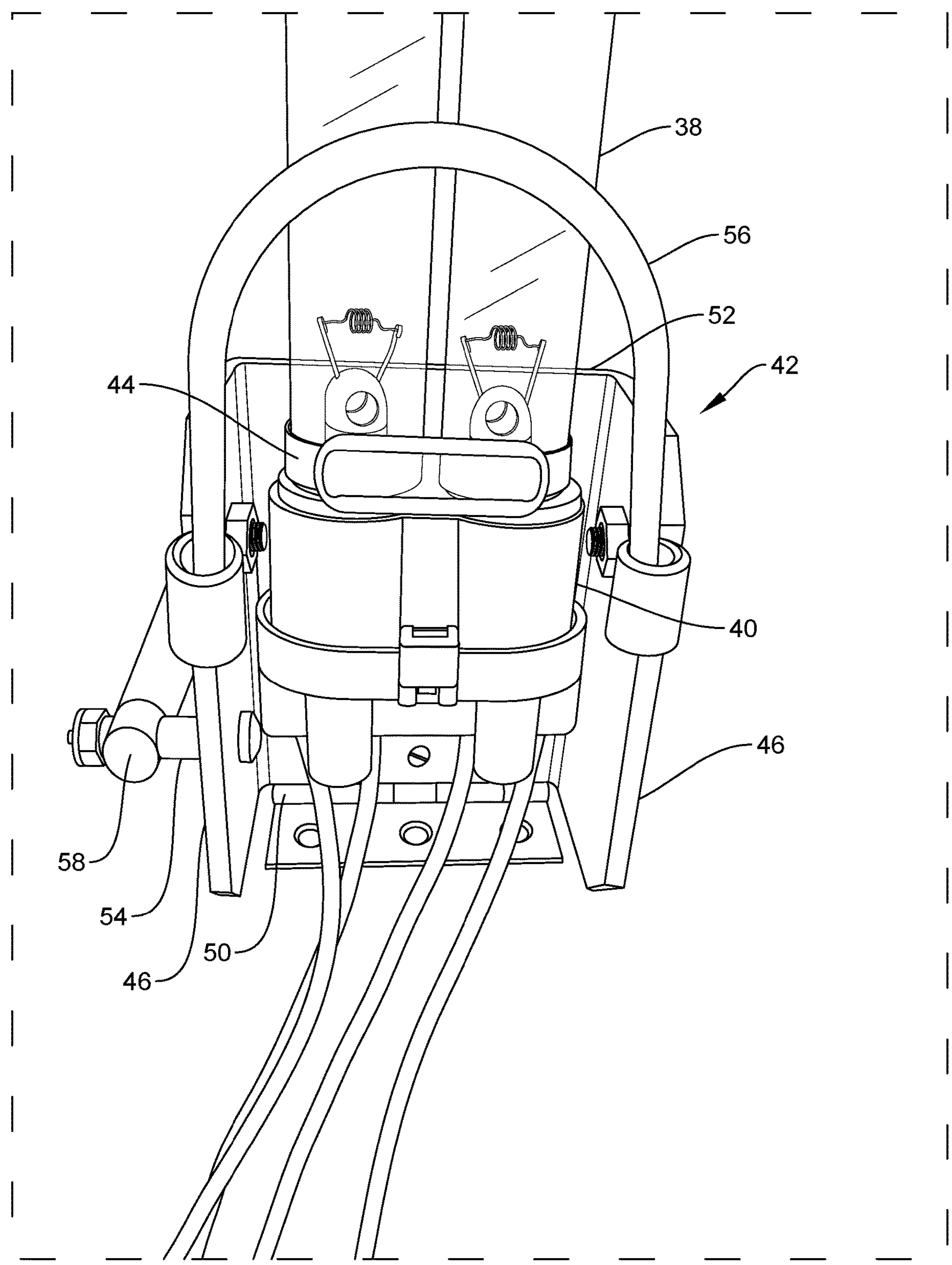
FIG. 10 is an end view of the light mount with the UVC lights in vertical position.
Figure 11:
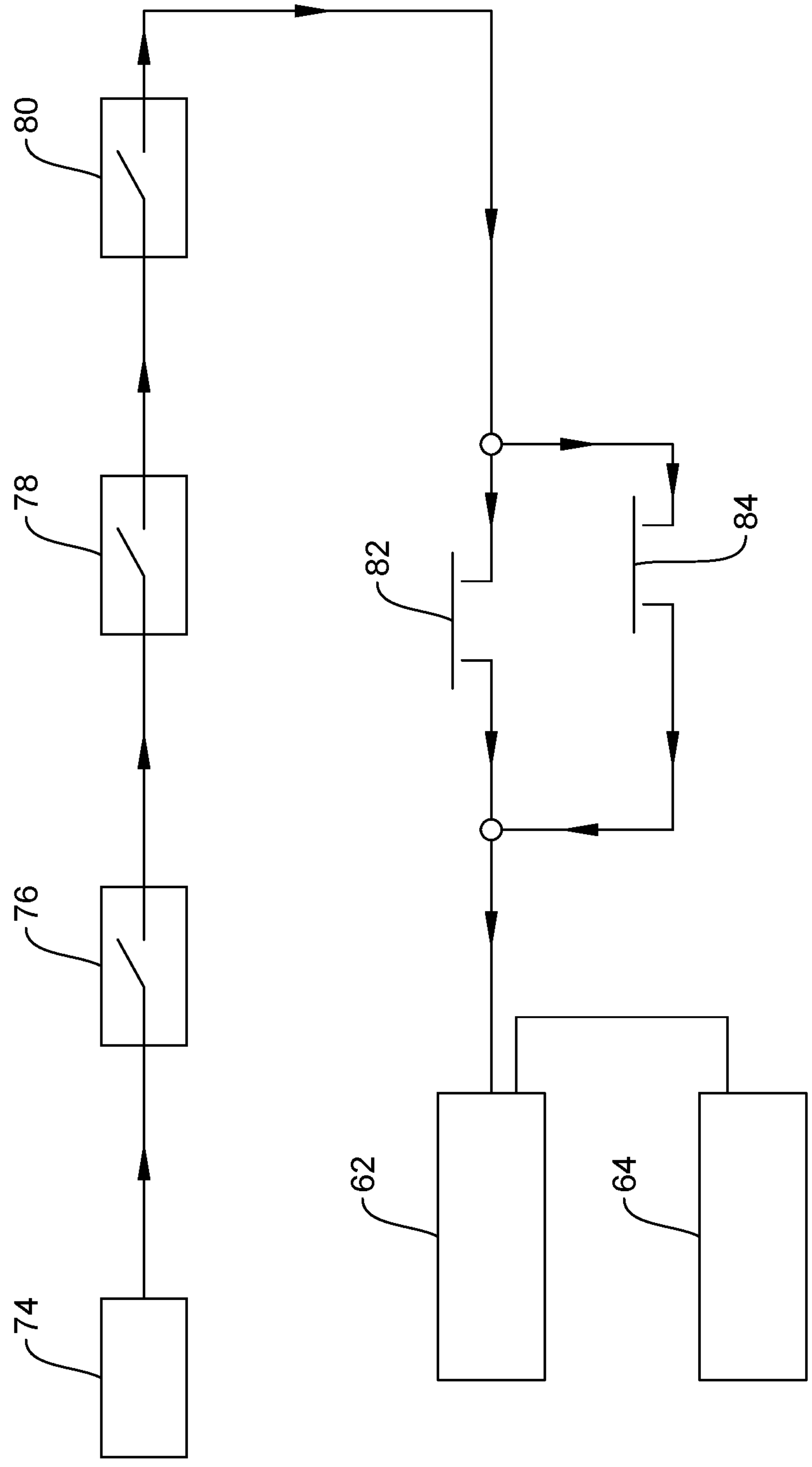
FIG. 11 is a 12V momentary switch power flow chart.
Figure 12:
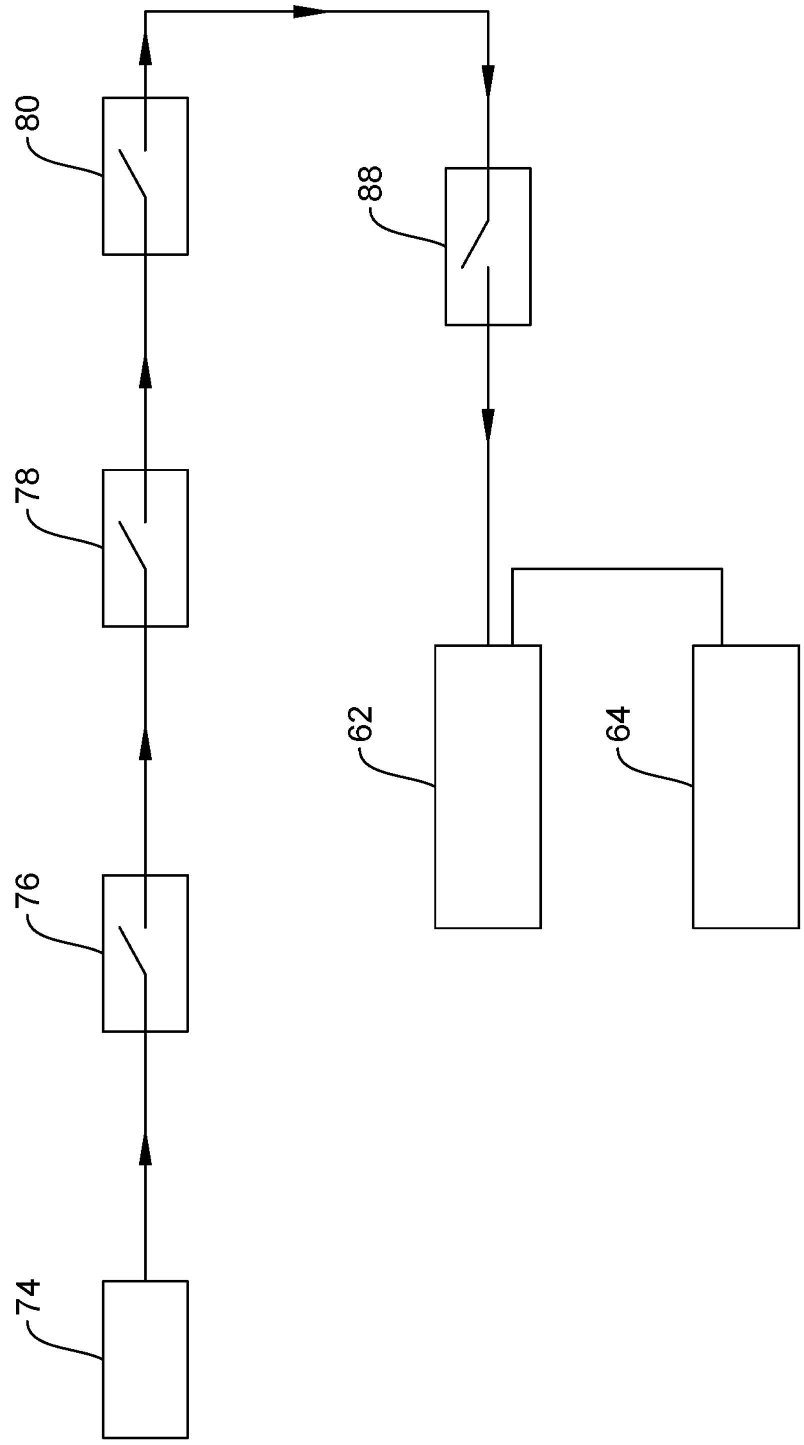
FIG. 12 is a 12V timer power flow chart.
Figure 13:
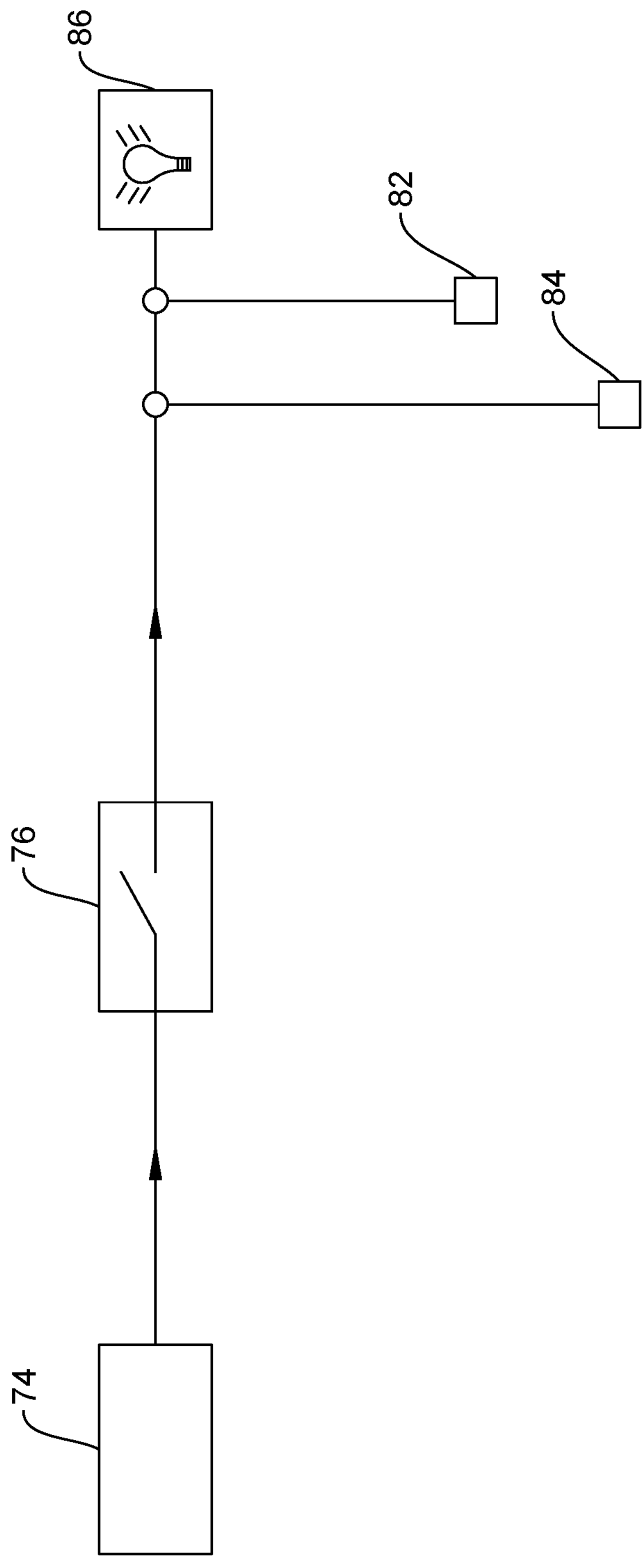
FIG. 13 is a 12V warning lights flow chart.
Figure 14:
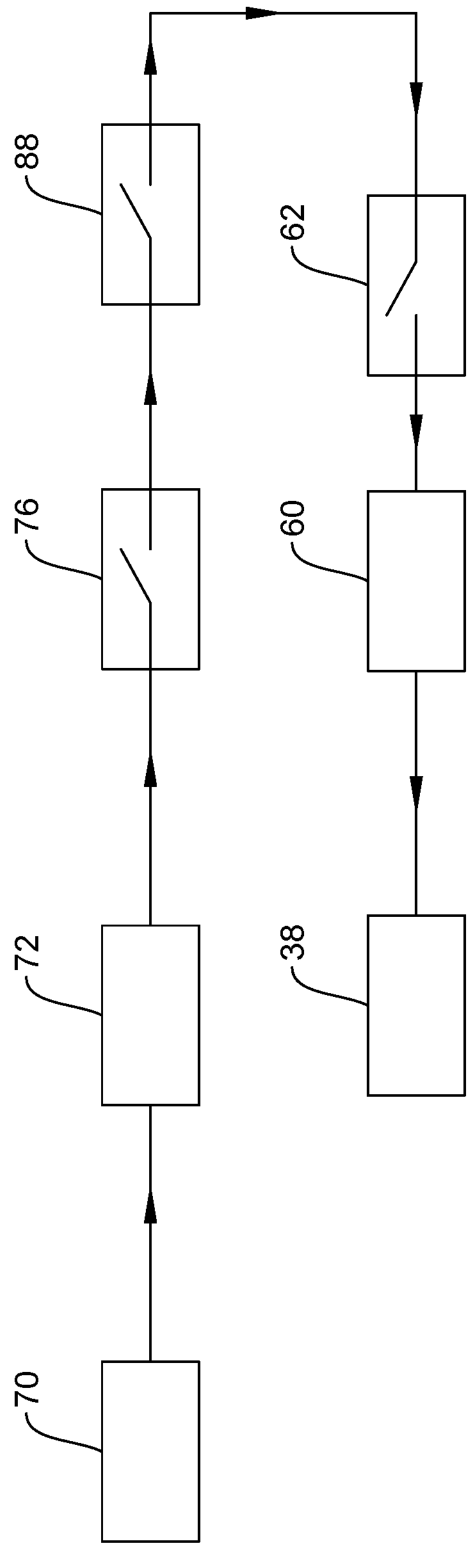
FIG. 14 is a 110V A/C power flow chart.

One or more UVC lights 38 are mounted in first compartment 26 as shown in FIGS. 2-4. In the form illustrated UVC lights 38 are elongated bulbs such that a longitudinal axis of the bulbs is aligned with the longitudinal axis of first compartment 26. Turning to FIGS. 8-10, bulbs 38 are seated in a light base 40 which is attached to a light mount 42. As shown in FIG. 10, each of bulbs 38 is held in light base 40 with a spring holder 44 around a glass part of the bulb together with a UV resistant silicone band which allows for some bulb movement if hit but keeps the bulbs from falling out when vertical as described below.

With continuing reference to FIGS. 8-10, light mount 42 is a U-shaped member with lateral side members 46 and a rectangular bottom member 48 (FIG. 9) which is attached to a pivot 50 at on open end. Pivot 50 is illustrated as a piano hinge but pivot 50 may be any type of pinned connection that allows some range of rotation. U-shaped member is closed at the other end with a transverse wall 52 joined to lateral side members 46. Light base 40 is attached to transverse wall 52 and is flanked by lateral side members 46 which extend slightly above the light base. A crank arm 54 is provided on one of lateral side members 46 by which light mount 42 may be rotated about pivot 50 as described below. A U-shaped door push 56 padded with a plastic coating is mounted on lateral side members 46 for pushing the spring biased center opening doors 30 open.

Figure 5:
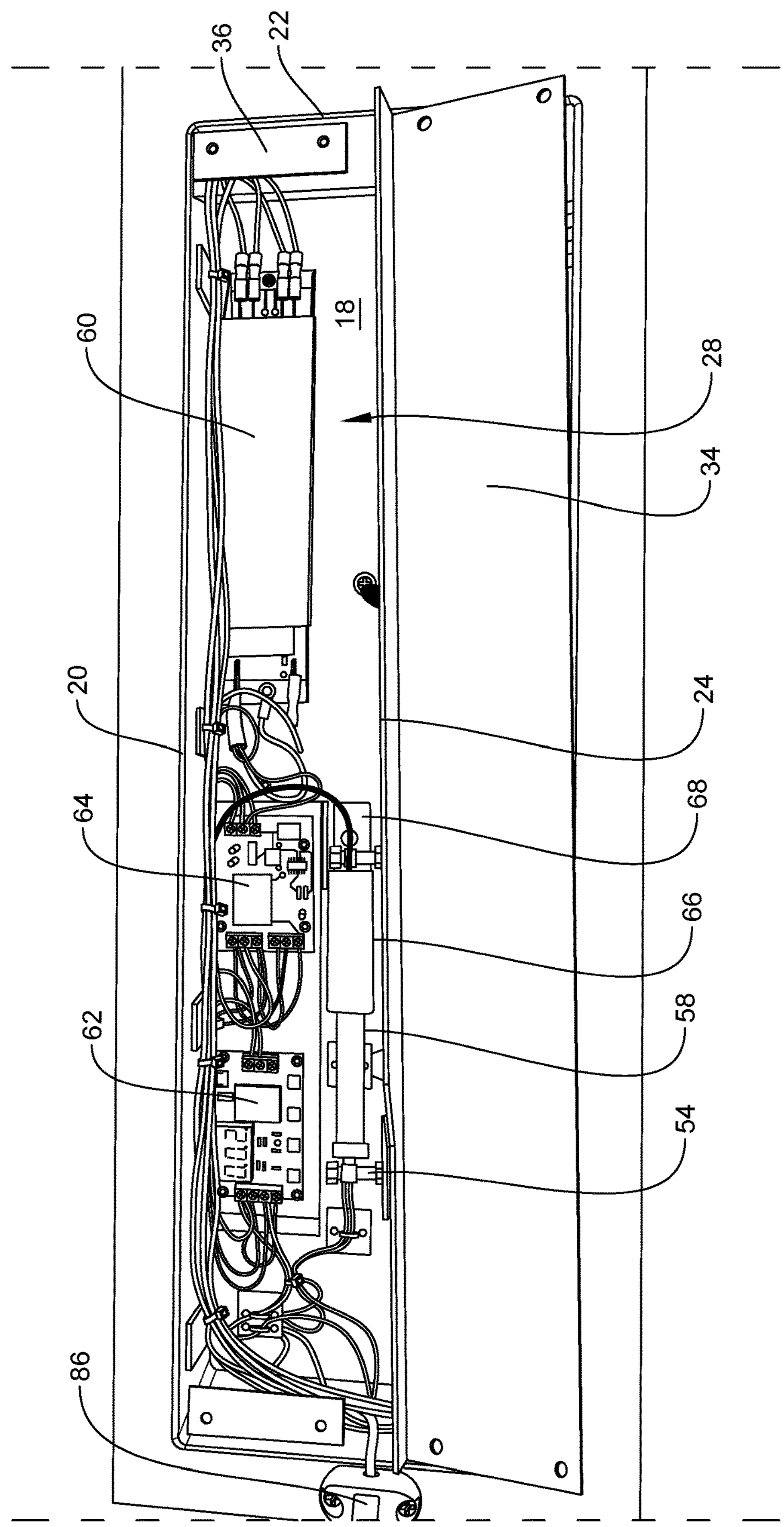
FIG. 5 is bottom view of the UVC light assembly showing a second compartment with a plate removed to show a linear actuator, ballast and timers.
Figure 6:
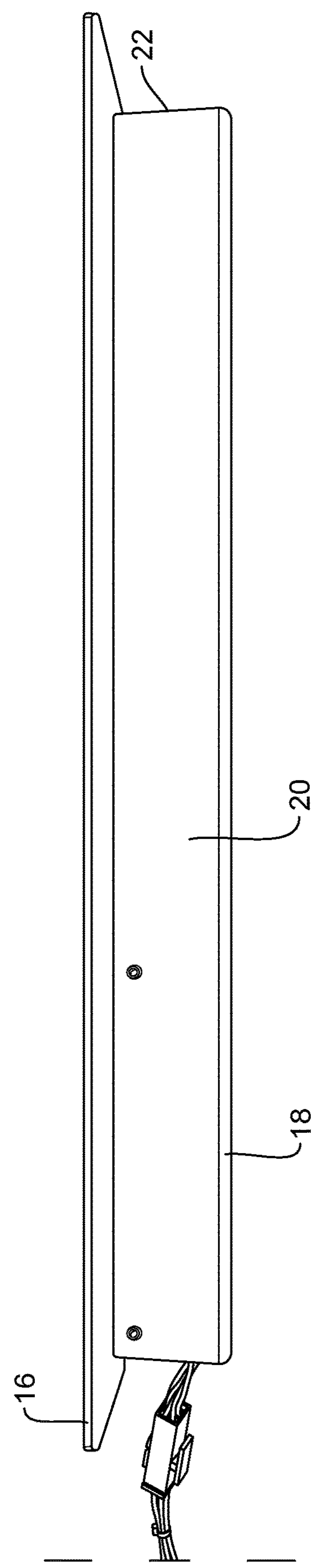
FIG. 6 is an external perspective view of the UVC light assembly.

Turning to FIG. 5, second compartment 28 includes a linear actuator 58, a ballast 60 for the UVC lights 38 and a timer element divided into a one channel delay on/delay off timer 62 and a two channel delay off timer 64. Linear actuator 58 is illustrated as a power screw powered by a DC motor 66. A base end of linear actuator 68 is pivoted to a bracket 68 attached to bottom wall 18 and a screw end attached to crank arm 54. It will be understood by those skilled in the art that linear actuator 58 may be any number of devices driven by a motor that allow a controlled extension and retraction such that light mount 42 may be rotated about pivot 50 by crank arm 54, including a hydraulically or pneumatically activated cylinder, a rack and pinion and so forth. In an embodiment, linear actuator 58 has a specific force at which DC motor 66 will stall to prevent bulb breakage if the bulbs 38 come in contact with an object while they are being deployed or stowed.

In use as shown in flow charts 16-19, an ambulance after a run is returned to home base and plugged into shoreline 70 which through an inverter 72 charges a 12V battery 74 in the truck. A 110V controlled 12V relay 76 connects battery 74 to the DC circuit.

If side door switch 78 and rear entry door switch 80 are closed, UVC light assembly 10 is activated when a momentary push button 82 near shoreline or a momentary push button 84 on the rear of the ambulance is pushed. This closes first micro switch 76 which turns on an a flashing light 86 on flange 16 of cabinet 14. First micro switch 76 also activates a light in the momentary push buttons 82, 84 and one channel delay on/delay off timer 62 and two channel delay off timer 64 are activated.

When activated, two channel delay off timer 64 causes linear actuator 58 to pivot the UVC light mount 42 from the horizontal to vertical position. As light mount 42 is brought to vertical position, a second micro switch 88 lets power flow through ballast 60 to UVC lights 38.

One channel delay on/delay off timer 62 is programmed to turn UVC lights off after a predetermined time sufficient to disinfect the patient cabin. The delay off period of two channel delay off timer 64 is longer than the delay off period of one channel delay on/delay off timer 62 such that the UVC bulbs 38 have time to cool. At the end of the delay off period of the two channel delay off timer 64, polarity on the linear actuator DC motor 66 is reversed and causing linear actuator 58 to rotate light mount 42 and bulbs 38 back into horizontal position. At the same time, warning light 86 on housing 14 and the lights in push button activation buttons 82, 84 are extinguished. As bulbs 38 near horizontal position, center opening doors 30 are closed by springs 32.

If during the disinfectant period the side door or rear door of the ambulane is opened, the DC circuit is broken and the UVC lights are extinguished. DC motor 66 has a separate power line. Polarity on the DC motor is reversed and linear actuator 58 pulls bulbs 38 back into housing 14.

While the flow charts show a 12V DC system plugged into shoreline, UVC lights assembly 10 may be operated solely on battery power. This may permit an operator to disinfect the cabin after delivering a patient to a hospital while paperwork is being done and be able to put the ambulance back into service without going to home base.

Although the invention has been described with reference to the embodiments illustrated in the drawings, various changes could be made in the above constructions without departing from the scope of the invention. It is intended that all matter contained in the above description or shown in the accompanying drawings shall be interpreted as illustrative and not in a limiting sense.

What is claimed:

1. A UVC light assembly for attachment to a ceiling of an ambulance patient cabin with a side door and a rear door, said assembly operable when the side door and rear door are closed, said assembly housed in flanged cabinet configured to be recessed into the ceiling, said cabinet having a bottom wall, side walls, end walls and a divider wall parallel to the side walls, said divider wall splitting the housing into first and second compartments, said first compartment closed with a pair of doors hinged to the divider wall and one of the side walls, said doors spring loaded in closed position, said second compartment closed with a removable plate, said first compartment containing a U-shaped light mount formed with lateral side members and a rectangular bottom member hinged at first end to the bottom wall in the first compartment and closed at a second end with a transverse wall to which a light base for one or more UVC lights is attached, said light mount in a first position positioning the one or more UVC lights in horizontal position relative to a floor surface of the ambulance patient cabin and in a second position positioning the one or more UVC lights in a vertical position relative to the floor surface of the ambulance patient cabin, said light mount including a door push for opening the spring biased doors, said second compartment containing a linear actuator operated by a DC motor, said DC motor under control of a timer which by reversing a polarity of an applied voltage to the DC motor rotates the UVC light mount between first and second positions.

2. The UVC light assembly of claim 1 further comprising a crank arm attached to one of the lateral walls of the light mount by which the light mount is rotated about the pivot by the linear actuator, said crank arm extending through the divider wall into the second compartment, said linear actuator being a power screw with a base end pivoted to a bracket attached to the floor of the second compartment and a screw end attached to the crank arm.

3. The UVC light assembly of claim 1 wherein the timer includes a first timer function for passing current for a first predetermined time through the light base after the light mount has been rotated into the second position and a second timer function for reversing the polarity of the applied voltage to the DC motor after a second predetermined time longer than the first predetermined time before rotating said light mount back into first position.

4. The UVC light assembly of claim 1 wherein the timer is not activated until a side entry door relay signals a side door of the patient cabin is closed and until a rear door relay signals a rear entry door of the patient cabin is closed.

5. The UVC light assembly of claim 1 wherein a U-shaped wire connected to the light mount engages the pair of doors hinged to the divider wall and one of the side walls pushing them open as the one or more UVC lights are pivoted into vertical position and holding them open until the UVC light is returned to horizontal position.

6. The UVC light assembly of claim 1 wherein a spring holder in the light base gives the one or more UVC lights movement to prevent breakage.

7. The UVC light assembly of claim 1 operated on battery power without the need to plug into shoreline.

* * * * *